United States Patent
Larsson

[11] Patent Number: 6,089,807
[45] Date of Patent: Jul. 18, 2000

[54] BOLT-AND-NUT JOINT

[75] Inventor: Nils Larsson, Västra Frölunda, Sweden

[73] Assignee: Arrow Plastic Ab, Hisings Backa, Sweden

[21] Appl. No.: 08/826,057

[22] Filed: Mar. 24, 1997

Related U.S. Application Data

[63] Continuation-in-part of application No. 08/392,909, Feb. 28, 1995, abandoned.

[30] Foreign Application Priority Data

Aug. 31, 1992 [SE] Sweden .................................. 9202492
Aug. 31, 1993 [SE] Sweden .................................. 9300714

[51] Int. Cl.[7] .............................. F16B 37/08; F16B 37/16
[52] U.S. Cl. .......................... 411/433; 411/435; 411/437; 4/236
[58] Field of Search .................................. 411/432, 433, 411/437, 237, 351, 435; 4/236

[56] References Cited

U.S. PATENT DOCUMENTS

| | | | |
|---|---|---|---|
| 1,329,126 | 1/1920 | Leming .................................. | 411/433 |
| 1,825,456 | 9/1931 | Henn .......................................... | 4/236 |
| 2,172,461 | 9/1939 | Whitescarver . | |
| 2,431,263 | 11/1947 | Lundgren .................................. | 4/236 |
| 3,075,204 | 1/1963 | Rocker ........................................ | 4/236 |
| 3,616,828 | 11/1971 | Jessmore .................................. | 411/433 |
| 3,675,530 | 7/1972 | Victor ....................................... | 411/433 |
| 5,087,161 | 2/1992 | Gunn ....................................... | 411/433 |

FOREIGN PATENT DOCUMENTS

| | | | |
|---|---|---|---|
| 83419 | 8/1976 | Australia ............................... | 411/433 |
| 1536344 | 8/1968 | France .................................... | 411/433 |
| 2 410 168 | 11/1977 | France . | |
| 2613789 | 10/1988 | France .................................... | 411/437 |
| 1046410 | 12/1958 | Germany ............................... | 411/433 |
| 2723058 A1 | 11/1978 | Germany . | |
| 812-996 | 6/1977 | U.S.S.R. . | |
| 964284A | 3/1981 | U.S.S.R. . | |
| WO88/01024 | 2/1988 | WIPO . | |

Primary Examiner—Neill R. Wilson
Attorney, Agent, or Firm—Klarquist Sparkman Campbell Leigh & Whinston, LLP

[57] ABSTRACT

A bolt-and-nut joint wherein the nut can be quickly relocated to an operative position on the bolt without deteriorating the locking function of the nut. In one aspect of the invention, a nut is provided with an axial slot extending through a wall of the nut. The width of the slot is somewhat smaller than the diameter of the bolt and the nut is produced of an elastic material that allows the nut to be snapped on and off the bolt via the slot at variable positions along the length of the bolt. The nut is tapered near one end for cooperation with a corresponding conical recess in a washer. The taper of the nut and the recess in the washer are chosen so that when the nut is tightened, the tapered part of the nut is wedged into the recess, urging the side walls of the nut to tighten around the bolt.

15 Claims, 5 Drawing Sheets

BOLT-AND-NUT JOINT

This application is continuation-in-part of application Ser. No. 08/392,909 filed Feb. 28, 1995 now abandoned, and which hereby incorporated by reference, and which is a national phase application of PCT application serial number PCT-SE93-00714 having an international filing date of Aug. 31, 1993. The PCT application, in turn, has a priority date of Aug. 31, 1992 based on application SE 9202492-6, filed in Sweden, Aug. 31, 1992.

FIELD OF THE INVENTION

The present invention relates generally to a bolt-nut-joint, and particularly relates to a bolt-nut-joint having a nut that can engage or disengage the bolt at variable positions along the length of the bolt.

BACKGROUND OF THE INVENTION

Prior lock-nuts are shown in CH 141119-C, GB 371,109-C, and WO 88/01024-A1. These lock-nuts have a slotted nut with a conical projection on one end thereof. The conical projection cooperates with a corresponding conical recess in a washer to urge the nut inwardly, thereby clamping the slotted nut to a bolt.

Many applications require a long bolt to cover the varying thicknesses of material that the bolt-nut-joint may join. However, when using a long bolt to join material that is relatively thin, the nut must be screwed along the entire length of an oversized bolt before tightening. In the case where the nut is difficult to access, this is a troublesome and time-consuming procedure.

SUMMARY OF THE INVENTION

The present invention provides a bolt-nut-joint wherein the nut can be quickly relocated to an operative position on the bolt without deteriorating the locking function of the nut. The nut can thereby be tightened with minimal screwing regardless of the length of the bolt.

In one aspect of the invention, a nut is provided with an axial slot extending through a wall of the nut. The width of the slot is substantially equal to (but slightly smaller than) the diameter of the bolt and the nut is made of an elastic material that allows the nut to be manually snapped on and off the bolt via the slot at variable positions along the length of the bolt. The nut has a tapered portion for cooperation with a corresponding conical recess in a washer, construction part or the like. The tapered portion of the nut and the recess in the washer is chosen so that when the nut is tightened the tapered portion is wedged into the conical recess thereby causing a radially inward pressure urging the nut to tighten about the bolt.

In another aspect of the invention, the bolt-nut-joint is specifically adapted for connecting a cover to a water closet seat (i.e., toilet). The bolt includes a rod receiving portion for connecting the cover. In operative position, the bolt extends through a mounting hole in the seat, and a recessed washer is slipped onto the bolt on an end opposite the rod receiving portion. A slotted nut is snapped onto the bolt adjacent the recessed washer. Thus, with minimal screwing, the nut can be tightened and the cover secured to the seat.

These advantages and other advantages and features of the invention will become apparent from the following description of a preferred embodiment, which proceeds with reference to the following drawings.

DETAILED DESCRIPTION OF A PREFERRED EMBODIMENT

Figure 1:
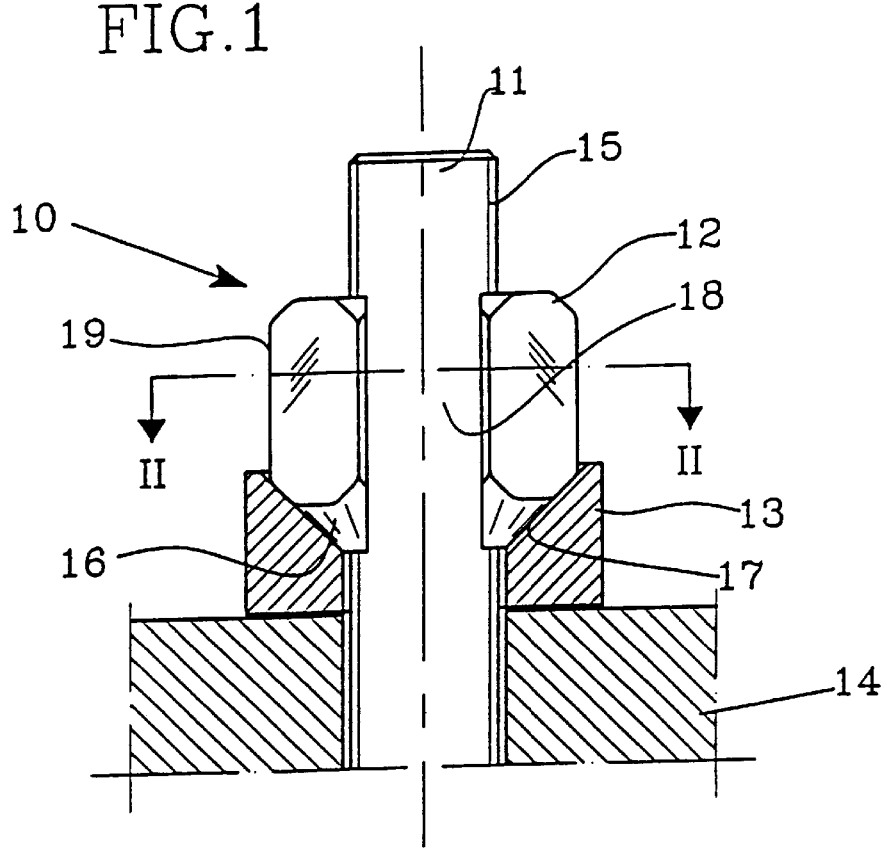
FIG. 1 is a cross-sectional view of the bolt-nut-joint according to the invention.

FIG. 1 shows a bolt-nut-joint 10 according to the invention. The bolt-nut-joint 10 includes a bolt 11, a nut 12, and a washer 13. The bolt-nut-joint 10 is shown mounted to a construction part 14.

The bolt 11 is of conventional type and equipped with outer threads 15. The nut 12 includes a conical tapered portion 16 at one end, which cooperates with a corresponding conical recess 17 in the washer 13.

Figure 2:
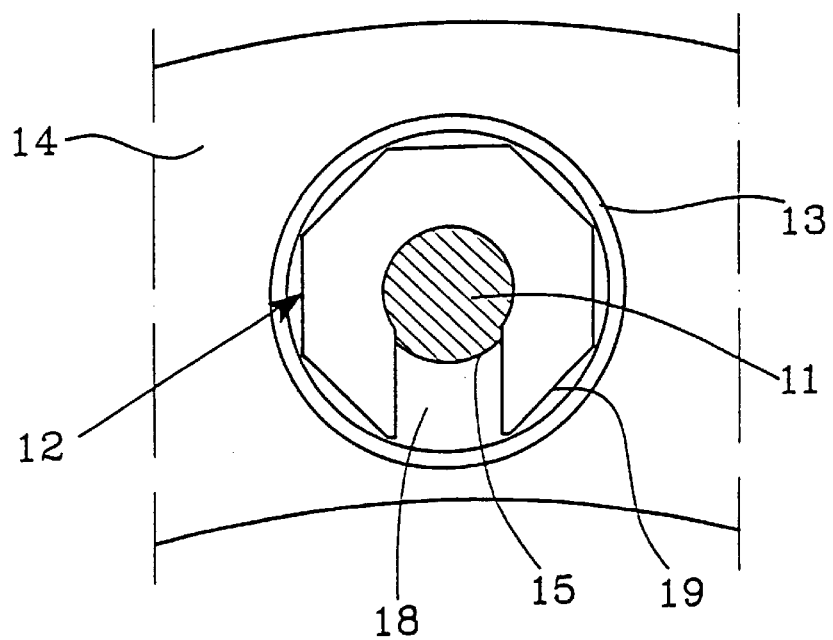
FIG. 2 is a cross-sectional view along line II—II of FIG. 1.

As most clearly shown in FIG. 2, the nut 12 has a side wall 19 and an axial slot 18 extending through the side wall and through the tapered portion 16. The axial slot 18 is slightly narrower than the width of the bolt's outer diameter. The tapered portion 16 and the washer 13 are chosen so that when the nut is tightened, the tapered portion 16 is wedged into the recess of the washer 13. As the tapered portion 16 engages the washer 13, the wedging effect causes a radially inward pressure on the tapered portion 16 to urge the walls 19 of the nut 12 to tighten around the bolt, thus locking the nut in place. Although the illustrated tapered portion is shown on the end of the nut, this is not necessarily required. The tapered portion only needs to be positioned on the nut so that as the nut is screwed toward the washer, the tapered portion engages the washer.

The nut 12 is produced of an elastic, resilient material, such as plastic or the like. The slot 18 is sized to allow the nut 12 to be snapped on or off the bolt 11 at variable positions along the length of the bolt. The slot 18 is wide enough and the elastic material flexible enough that the nut 12 can be snapped on or off just using ones hands, without the need for a tool. Consequently the nut does not need to be screwed along the length of the bolt to properly position the nut. Instead, the nut can snap on the bolt at an almost fully tightened position and screwed a minimal amount to wedge the nut in place. Because the nut is made of plastic, it can be snapped on and off the bolt multiple times without deteriorating the locking function of the nut. The size of the slot also plays a part in the durability of the nut. That is, the width of the slot is nearly equal to the diameter of the bolt so that the nut is only slightly deformed when snapped on and off of the bolt.

Figure 3:
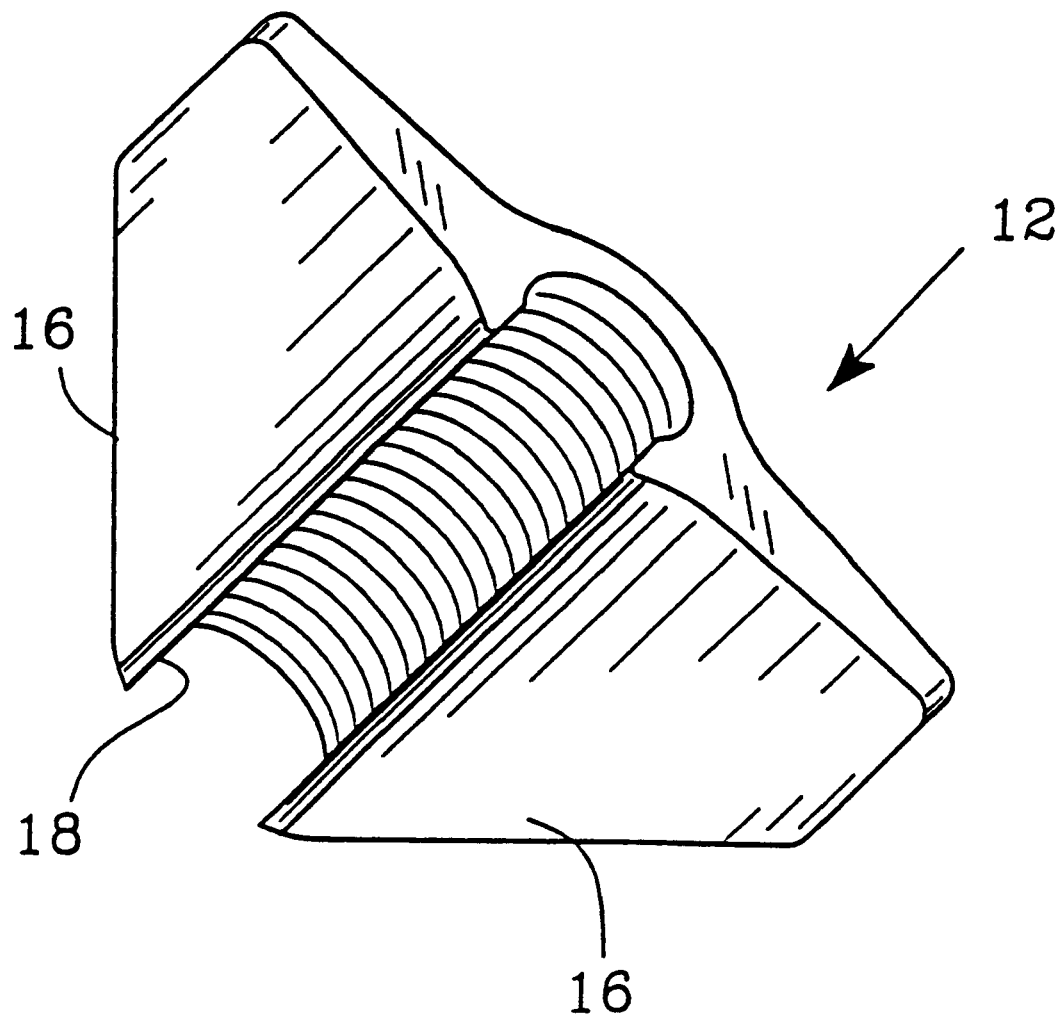
FIG. 3 is a perspective view of another embodiment of the lock-nut according to the invention.

The nut 12 can of course have different designs. For instance, the octagonal-like shape as shown in FIGS. 1 and 2 can instead be designed as a wing nut, such as shown in FIG. 3. Other designs can also be used. The wing nut has a tapered portion 16 adjacent the nut's bottom.

Figure 4:
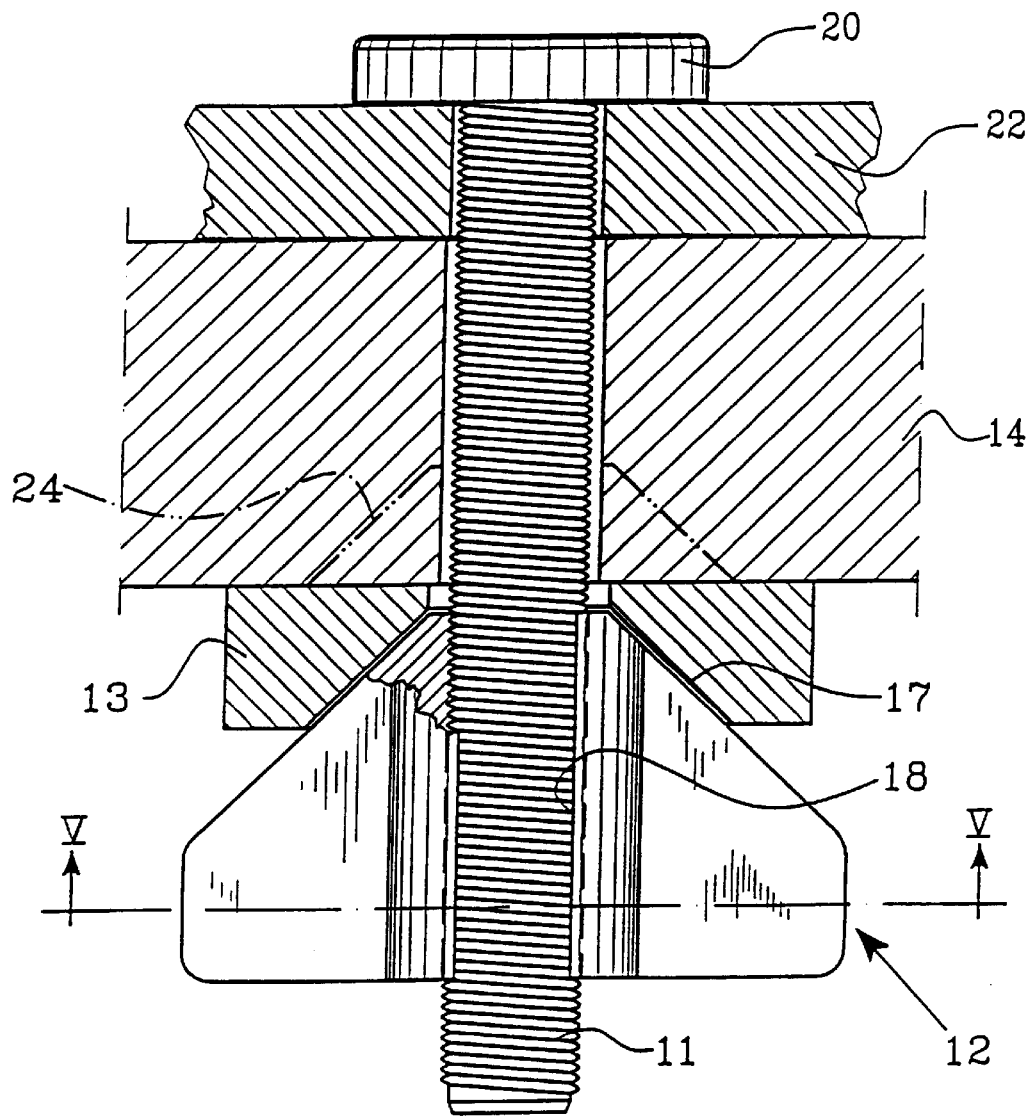
FIG. 4 is a cross-sectional view of the lock-nut of FIG. 3 mounted to a bolt.
Figure 5:
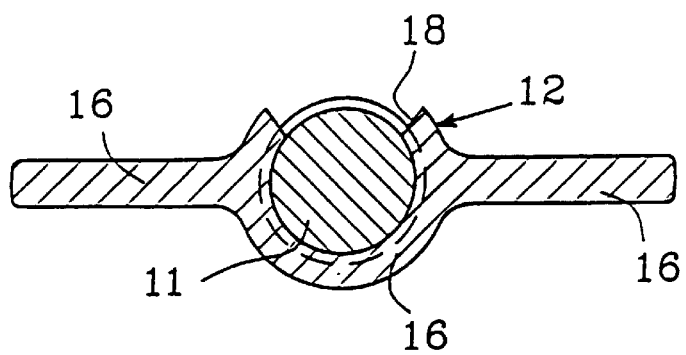
FIG. 5 is a cross-sectional view along line 5—5 of FIG. 4.

FIG. 4 shows the wing nut of FIG. 3 mounted to the bolt 11 for securing a construction piece 22 to another construction piece 14. The bolt 11 has a flat head 20 positioned adjacent the construction piece 22. The tapered portion 16 is screwed into the recess in the washer 13 to lock the nut in position as described above.

The construction piece 14 may have a conical recess 24 (shown in dashed lines) in place of the washer 13. The conical recess 24 corresponds to the tapered portion 16. As the nut 12 engages the recess 24, the surface 16 wedges into the recess to lock the nut in place.

Figure 6:
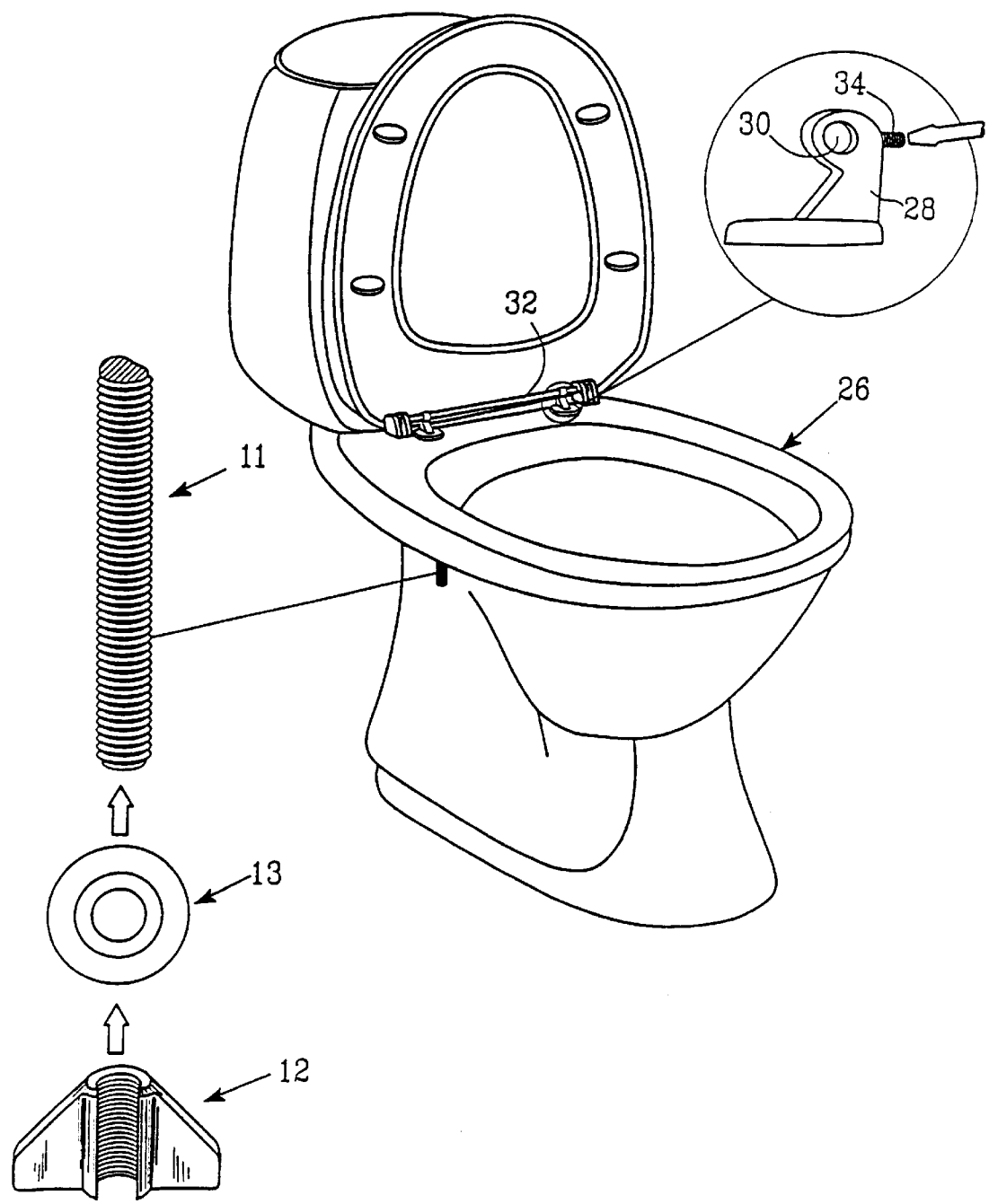
FIG. 6 is a perspective view of a water closet seat having a seat cover mounted thereto using another embodiment of the bolt-nut-joint according to the invention.
Figure 7:
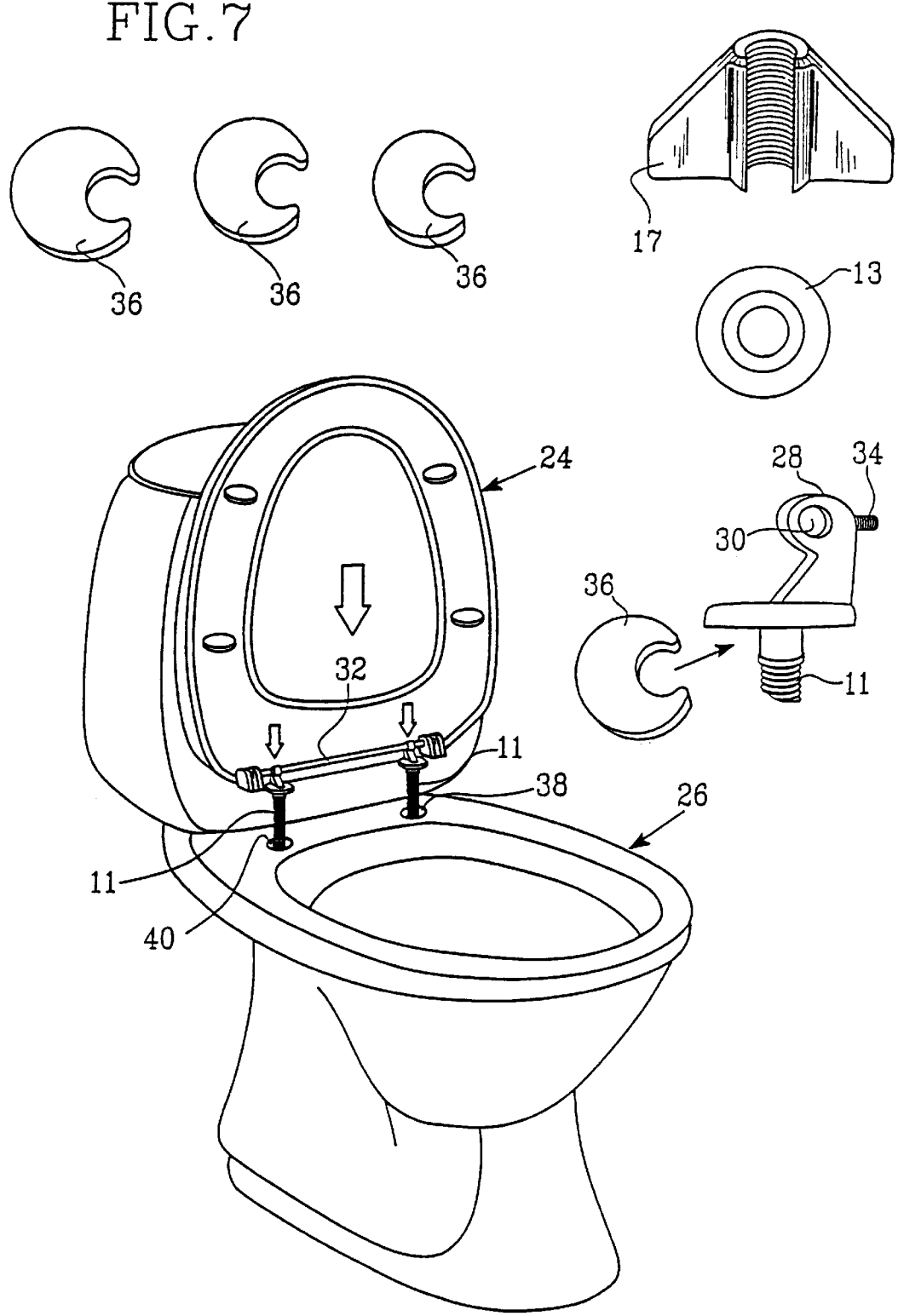
FIG. 7 is a perspective view of the water closet seat of FIG. 6 showing spacers that can be used in conjunction with the bolt-nut-joint.

FIGS. 6 and 7 shows the bolt-and-nut joint 10 for securing a cover 24 to a water closet seat 26 (i.e., toilet). The bolt-and-nut joint 10 has a rod receiving portion 28 located at one end of the bolt 11. The rod receiving portion 28 has a hole 30 therethrough for receiving a rod 32. A rod-securing screw 34 extends through a back wall in portion 28 and extends into the hole 30. The screw 30 is tightened to secure the rod 32 in place. Slotted washers 36 can be slipped onto the bolt 11 adjacent the rod receiving portion 28. The washers 36 function as spacers for raising or lowering the height of the rod receiving portion 28 and, consequently, the height of the cover 24.

To connect the cover 24 to the seat 26, the rod receiving portions 28 of two bolts 11 are slipped onto opposing ends of the rod 32. The ends of the bolts 11 opposite the rod receiving portions are inserted through cover-mounting holes 38, 40 (FIG. 7) located near the rear of the seat 26. One or more slotted washers 36 are slipped onto each bolt adjacent the rod receiving portions 28 and are positioned on the top side of the seat 26. With the bolts 11 extending through the holes 38, 40, the recessed washer 13 is slipped onto the bottom of the bolt 11 (best shown in FIG. 6) and the nut 12 is snapped on by hand and screwed in place. The rod-securing screws 34 are then tightened to secure the rod in place.

Having illustrated and described the principles of the invention in a preferred embodiment, it should be apparent to those skilled in the art that the preferred embodiment can be modified in arrangement and detail without departing from such principles.

For example, although the tapered portion 16 is shown on the end of the nut, the tapered portion could be near the end of the nut but not necessarily formed on the end of the nut. Thus, when it is said that the tapered portion is "adjacent" one end of the nut, this includes that the tapered portion may be formed on the end of the nut or near the end of the nut.

In view of the many possible embodiments to which the principles of the invention may be applied, it should be recognized that the illustrated embodiment is only an example of the invention and should not be taken as a limitation on the scope of the invention. Rather, the invention is defined by the following claims.

The reference numeral
10 bolt-nut-joint
11 bolt
12 nut
13 washer
14 construction part
15 outer threads
16 tapered portion
17 recess
18 slot
19 sides of nut
20 head of bolt
22 construction part
24 seat cover
26 seat
28 rod receiving portion
30 hole in rod receiving portion
32 rod
34 rod-securing screw
36 spacing washer
38, 40 cover-mounting holes

What is claimed is:

1. A lock-nut assembly that is lockable upon a bolt, comprising:
   a nut having a side wall and opposing ends, and a longitudinal slot defined through the side wall, the nut being elastically deformable for permitting the nut to be manually snapped on and off the bolt through the slot;
   the nut having a tapered portion;
   a recess member having a recess defined therein, the recess having a recessed conical surface that is matable with the tapered portion such that the nut is urged radially inwardly for tightening about the bolt as the nut engages the recess member; and
   wherein the nut is a wing nut having first and second wings and the tapered portion is part of a lower edge of the wings.

2. The lock nut assembly of claim 1, wherein the nut has opposing wing projections permitting the nut to be tightened by hand.

3. The lock nut assembly of claim 1, wherein the recess member is a washer with said recess defined therein.

4. The lock nut assembly of claim 1, wherein the recess member is a construction part with said recess defined therein.

5. The lock nut assembly of claim 1, wherein the recess member has an annular shape.

6. The lock nut assembly of claim 1, wherein the nut is made of resilient plastic.

7. The lock nut assembly of claim 1, wherein the tapered portion extends only part way around the nut so as to leave the slot with a width substantially equal to a diameter of the bolt.

8. The lock nut assembly of claim 1, wherein the tapered portion is formed on one end of the nut.

9. A lock nut assembly that is lockable upon a bolt, comprising:
   a nut having a wall and opposing ends, a longitudinal slot being defined through the wall, the nut being a plastic material and resiliently deformable for permitting the nut to be manually snapped on and off the bolt through the slot, the slot having a width substantially equal to a diameter of the bolt;
   a conical surface positioned adjacent one of the ends of the nut;
   a recess member having a recessed conical surface defined therein that is matable with the conical surface of the nut so that the nut is urged radially inwardly for tightening about the bolt as the nut engages the recess member; and
   the slot having a width for being slightly less than a diameter of the bolt.

10. A lock-nut assembly for attaching a cover to a seat, wherein the cover includes a rod upon which the cover is rotatably mounted, comprising:

a threaded bolt having a rod receiving portion at one end thereof, the rod receiving portion having a hole therethrough for receiving the rod;

a nut having a side wall and opposing ends, and a longitudinal slot defined through the side wall, the nut being made of plastic that is resiliently deformable for permitting the nut to be manually snapped on and off the bolt through the slot;

the nut having a tapered surface; and a recess member having a recessed conical surface defined therein that is matable with the tapered surface such that the nut is urged inward for tightening about the bolt as the nut engages the recess member.

11. The lock-nut assembly of claim 10 further including a screw extending through the rod receiving portion and into the hole for fastening the rod to the lock-nut assembly.

12. The lock nut assembly of claim 10, wherein the tapered surface is formed adjacent to one end of the nut.

13. A method of attaching a cover to a seat, comprising the steps of:

providing a seat having two cover mounting holes therein and a cover having a rod attached thereto;

inserting a threaded bolt through each of the two cover mounting holes, the threaded bolts having a rod receiving portion on one end with a hole therein for receiving the rod;

sliding a washer onto each bolt at an end opposite the rod receiving portion, the washer having a recess defined therein;

snapping a nut having a slot therein onto each bolt by forcing the bolt through the slot in the nut, the slotted nut having a conical member that is matable with the recess of the washer;

screwing the slotted nut towards the recess member to wedge the conical member of the nut in the recess of the washer to tighten the nut onto the bolt.

14. The method of claim 13 further including sliding opposing ends of the rod into the rod receiving portions.

15. The method of claim 14 including clamping the rod in place by turning a screw positioned through the rod receiving portion and extending into the hole of the rod receiving portion.

\* \* \* \* \*